United States Patent [19]
Warn et al.

[11] Patent Number: 5,659,482
[45] Date of Patent: Aug. 19, 1997

[54] LIQUID DISPENSER CONTROL SYSTEM INTERFACED TO A CASH REGISTER

[76] Inventors: Walter E. Warn, 207 Whitfield St., Knightdale, N.C. 27545; Fred K. Carr, 915 Coker Dr., Chapel Hill, N.C. 27514

[21] Appl. No.: 425,201

[22] Filed: Apr. 20, 1995

[51] Int. Cl.⁶ .............................. G06F 19/00; G06F 17/60
[52] U.S. Cl. .................. 364/479.06; 222/129.4; 364/479.1; 364/479.11; 395/215; 395/216; 395/222
[58] Field of Search ............................ 364/478, 401, 364/402, 403, 405, 406, 509, 510, 465, 479, 479.06, 479.07, 479.1, 479.11, 479.12; 222/52, 23, 129.4, 129, 132, 14; 395/215, 216, 221, 222

[56] References Cited

U.S. PATENT DOCUMENTS

| | | | |
|---|---|---|---|
| 4,276,999 | 7/1981 | Reichenberger | 364/479 |
| 4,487,333 | 12/1984 | Pounder et al. | 364/509 X |
| 4,800,492 | 1/1989 | Johnson et al. | 364/479 X |
| 4,827,426 | 5/1989 | Patton et al. | 364/465 X |
| 5,027,284 | 6/1991 | Senghaas et al. | 364/479 |
| 5,227,966 | 7/1993 | Ichiba | 364/405 |

*Primary Examiner*—Joseph Ruggiero
*Attorney, Agent, or Firm*—Fred K. Carr

[57] ABSTRACT

A microprocessor based dispenser control system for controlling the dispensing process in a liquid pump and storing information on the type and number of times the liquid has been dispensed is disclosed. The system includes a dispensing pump and a control console for controlling the pump. The console is interfaced to a cash register, point-of-sales system, or printer for down-loading information to these. In a preferred embodiment, the dispensing pump is a squeeze type pump driven by a stepper motor. The microprocessor uses a pulse drive source to control the stepper motor.

8 Claims, 9 Drawing Sheets

LIQUID DISPENSER CONTROL SYSTEM INTERFACED TO A CASH REGISTER

FIELD OF THE INVENTION

The present invention relates to a device and method for dispensing liquids, and in particular, for dispensing a preset amount of alcoholic beverage into a drink and for storing information on the type and number of beverages dispensed.

BACKGROUND OF THE INVENTION

Mixed drink beverages are most often made by a bartender pouring an amount of alcoholic beverage into a glass followed by a mixer for dilution. While the bartender may use some type measuring device such as a shot or ounce glass to assist in measuring the amount of alcoholic beverage poured in the glass, the amount added is most often not the exact amount the bartender intended to add. In public bars and restaurants, the time factor does not allow the bartender the time to measure the alcoholic beverage added precisely.

In managing bars and restaurants, it would be beneficial for management to have an exact record of the type and number of drinks served over a time period, for example, the number of bourbon drinks, gin drinks, vodka drinks, etc. Management further has an interest in making sure the bartender charges the customer for each drink served.

In brief, the present invention is a microprocessor MP based dispensing system for exactly dispensing a preset amount of alcoholic beverage into a glass, for storing information on the type and number of beverages dispensed, and for down-loading this information to other devices including cash registers, Point-of-Sales POS systems, and printers.

U.S. Pat. No. 5,344,336, having common inventors, relates to a fuel dispenser-cash register control console for controlling fuel dispensers and down-loading fuel sales information to a cash register. The present invention improves the technology to include a method and device for controlling liquor dispensers and storing information on the type and number of drinks dispensed.

SUMMARY OF THE INVENTION

In summary, the present invention relates to a MP based dispenser control system for controlling the dispensing process in a liquid pump and storing information on the type and number of liquids dispensed. The system includes a pump coupled to a tube connected to a liquid reservoir for dispensing the liquid. A control console has a programmable data processor with read-only-memory ROM and read-and-write-memory RAM which controls the pump. The data processor retrieves pump control commands from the ROM in a predetermined sequence and outputs the commands to the pump causing it to dispense a preset amount of liquid. The processor further stores information in the RAM on the type and number of liquids dispensed. Information on the type and number of liquids dispensed can be down-loaded to a cash register or POS system. In a preferred embodiment, the pump is of the squeeze type where a stepper motor controls the speed. The MP uses a pulse driver source to control the stepper motor.

Accordingly, the primary object of the present invention is to provide a liquid dispenser control system.

Another object is to provide a liquid dispenser control system which causes a pump to dispense a preset amount of alcoholic beverage.

A further object is to provide a liquid dispenser control system which stores information on the type and number of times the liquid has been dispensed.

A further object is to provide a liquid dispenser control system which down-loads information to a cash register or POS system.

BRIEF DESCRIPTION OF THE DRAWINGS

Other objects of this invention will appear in the following specification and claims, reference being made now to the accompanying drawings which form a part thereof.

DETAILED DESCRIPTION OF A PREFERRED EMBODIMENT

Figure 1:
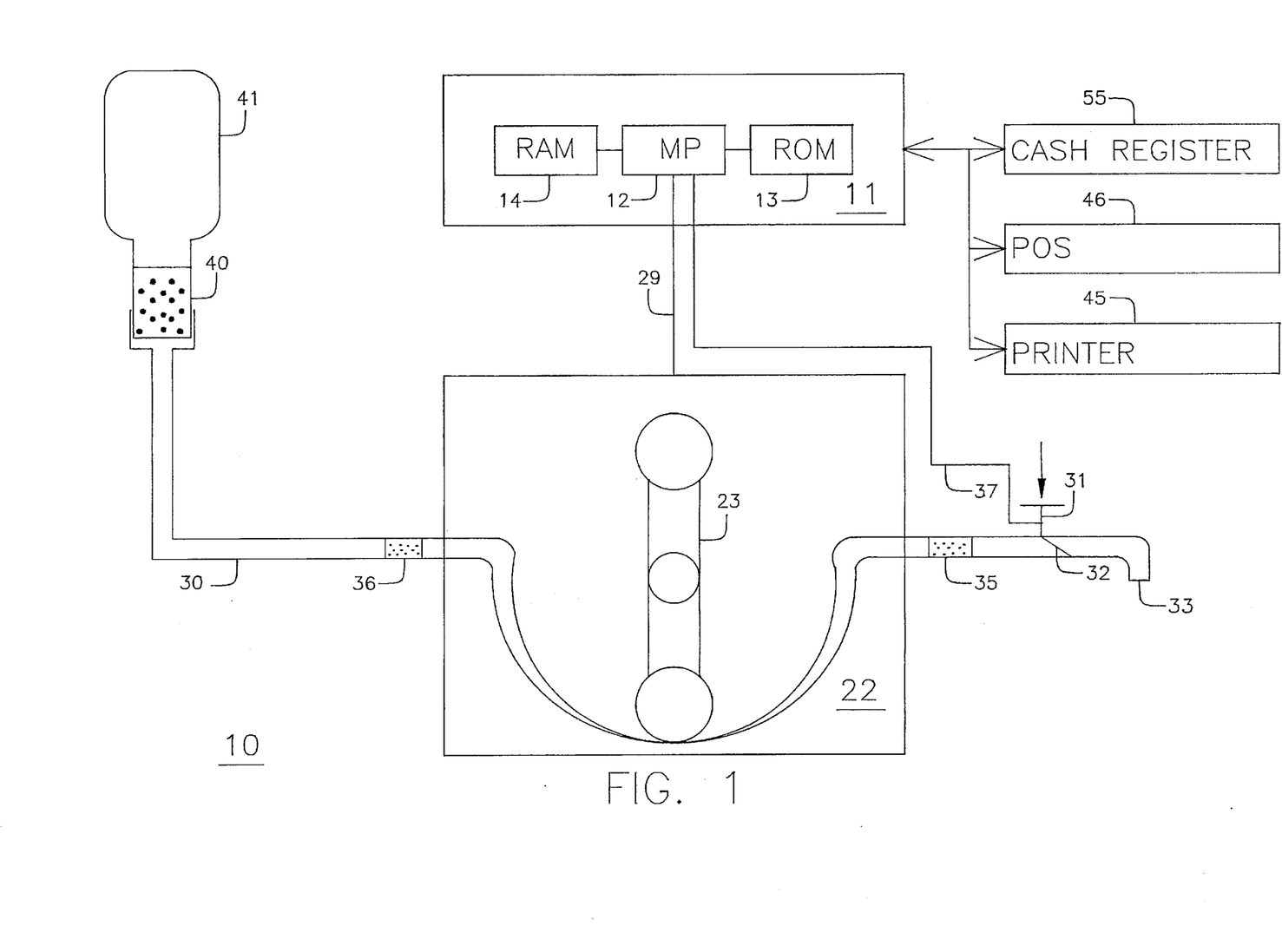
FIG. 1 is a schematic diagram of the liquid dispenser control system including the control console and dispensing pump.

Referring now to FIG. 1, there is shown a schematic overview of the liquid dispenser control system, generally designated (10), which includes a control console (11) for controlling the dispensing process in a pump (22) and for storing information on the type and number of liquids dispensed. The pump (22) pumps liquid from a reservoir (41) through tubing (30) to and out spout (33). Information on the type liquid and the number of times the liquid has been dispensed is stored in memory. This information can be down-loaded to a cash register (55), a Point-of-Sales (POS) system (46), or a printer (45). The term liquid in this specification generally refers to any alcoholic beverages including wine.

The control console (11) includes a programmable MP (12) with read-only-memory ROM (13) and read-and-write-memory RAM (14). The control console (11) is programmed to cause the pump (22) to dispense a preset amount of liquid from reservoir (41), generally from 0.5 to 32 ounces. In the illustration, the pump (22) is a squeeze type pump where the shaft (23) has a roller on each end; as the shaft rotates it causes liquid to be pumped through the tube (30). A stepper motor drives the pump (22) causing it to dispense a preset amount of liquid. The MP (12) controls the repetition rate of the stepper motor by a pulse driver supplied to the stepper motor to cause the liquid to be dispensed. Connections (35,36) allow one to change the tubing which comes in contact with the rotating shaft (23). While the pump in the illustration is of the squeeze type, other types of positive displacement pumps could be used. Further in the illustration, the control console (11) is shown controlling only one pump. It is understood that the console can control several pumps simultaneously, each dispensing a different type liquid.

The liquid dispenser control system (10) can be used in a bar setting to dispense a preset amount of alcoholic beverage into a glass for making drinks or cocktails. The control console (11) causes the pump to dispense a preset amount of alcoholic beverage and stores information on the type and number of beverages dispensed. The reservoir (41) in this case is a bottle of alcoholic beverage to be dispensed which is connected to the tubing (30) by connection (40). During operation, the bartender holds a glass (not shown) under spout (33) and depresses activating switch (31). Activating switch (31) has an electrical connection (37) to MP (12), and simultaneously opens valve (32). Control console (11) causes shaft (23) to rotate dispensing a preset amount of alcoholic beverage.

The control console (11) stores in RAM (14) information on the type beverage dispensed and the number of times the beverage has been dispensed. This information can be down-loaded to other devices including a cash register (55), a POS system (46), or a printer (45) at request. For example, it can store re-settable totals and non re-settable totals. Re-settable totals could, for example, provide shift totals accounting for the number of drinks make by a bartender during his shift. Non re-settable totals could, for example, be a running total of drinks dispensed over a longer period of time.

Figure 2:
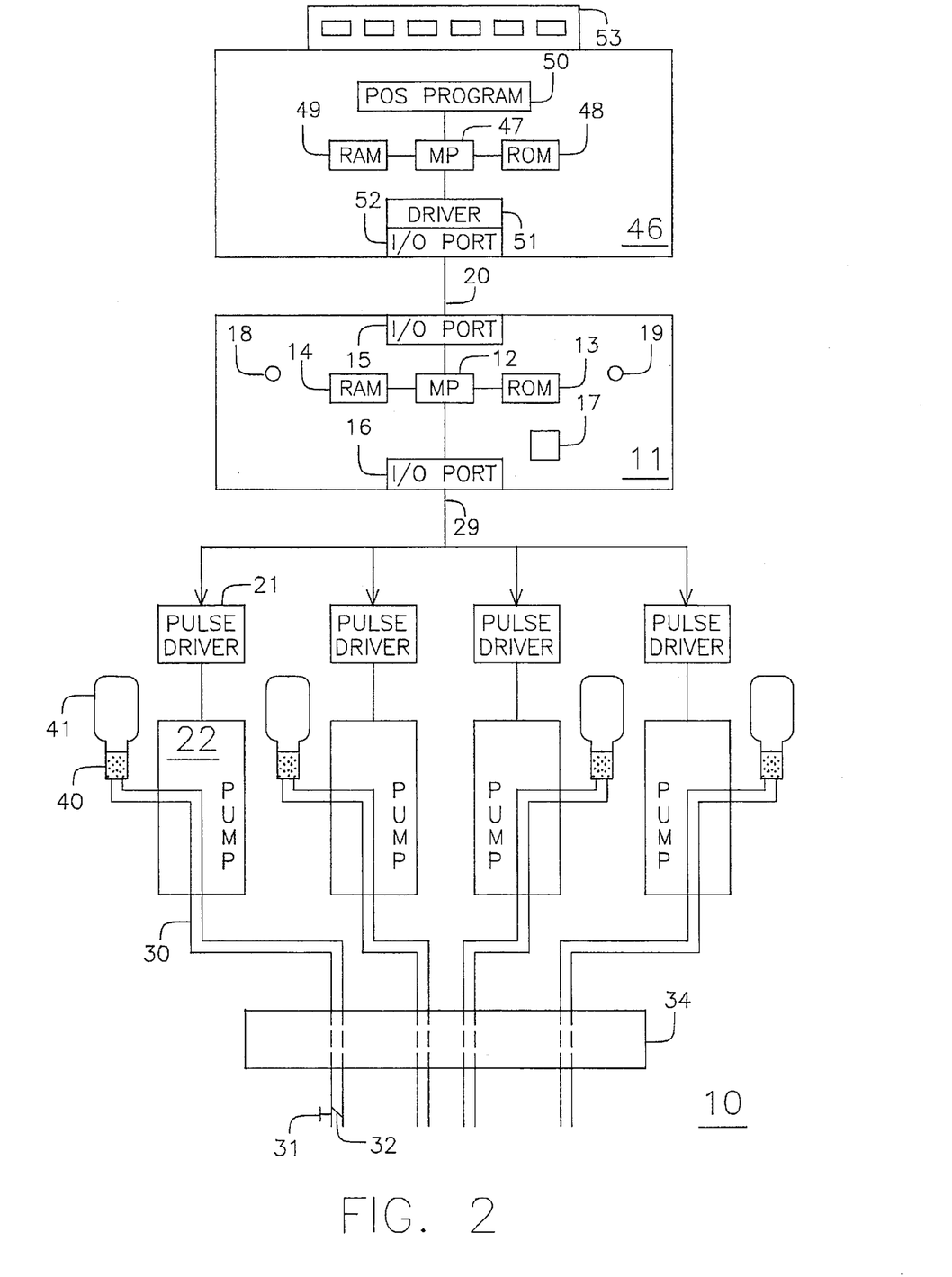
FIG. 2 is block diagram of the liquor dispenser control system coupled to a POS system and four dispensing pumps.

Referring now to FIG. 2, there is shown a block diagram of the dispenser control system (10) where the control console (11) is connected to a POS system (46) and four dispensing pumps (22). POS systems are presently used in bars and restaurants to track other items including menu items, orders, serving waiters, etc. With present systems, these items have to be keyed in through input keys (53). With the present invention, information on drinks made and served is automatically down-loaded to the POS (46) eliminating human error or intentional false entries. Generally, a POS system includes an application program (50), MP (47), ROM (48), and RAM (49) for processing and storing information, which constitutes a POS means. The POS system (46) is electrically connected to the control console (11) through serial cable (20) and I/O port (52). A driver (51) controls the flow of data between the POS system (46) and the control console (11). Reference is made to U.S. Pat. No. 5,270,943 having a common inventor for a discussion of driver function.

The pump in the present invention is of the displacement type in which volumetric flow is directly proportional to the speed of operation. The pump is mechanically driven by an electric motor that is preferably of the stepper type. A pulse driver source (21) supplies drive pulses to the motor at a repetition rate which is controlled by a MP (12), depending on the amount of beverage set to be dispensed. In the illustration, the control console (11) is coupled to four pumps (22), each associated with a pulse drive source (21). For example, tube (30) directs liquid from reservoir (41) through pump (22) out the spout. The tubes are collected in the enclosure (34). The control console (11) is connected to the POS (46) through cable (20) and I/O port (52), and to the pumps (22) through cable (29). As later discussed, volume control switches (18,19) allow one to control the volume dispensed from each pump, generally from 0.5 ounce to 32 ounces. A baud rate chip (17) controls the communication.

The MP (12) in the control console (11) operates in a conventional manner. Specific implementations of the MP (12) are well known to those skilled in the art, and include for example, integrated circuits manufactured by INTEL. The MP is functionally connected to a ROM chip (13) and a RAM chip (35); program control for the MP (11) is stored in ROM (13), and the computation programs are stored in RAM (14). Information processed by the MP can be stored generally in any storage device. As an example, it can be stored in a non volatile read and write memory chip such that information will not be lost if power is lost. This information can also be stored in the system operating RAM (35) or it can be down-loaded to processor based storage devices exterior to the control console including POS systems, cash registers (11).

Figure 3:
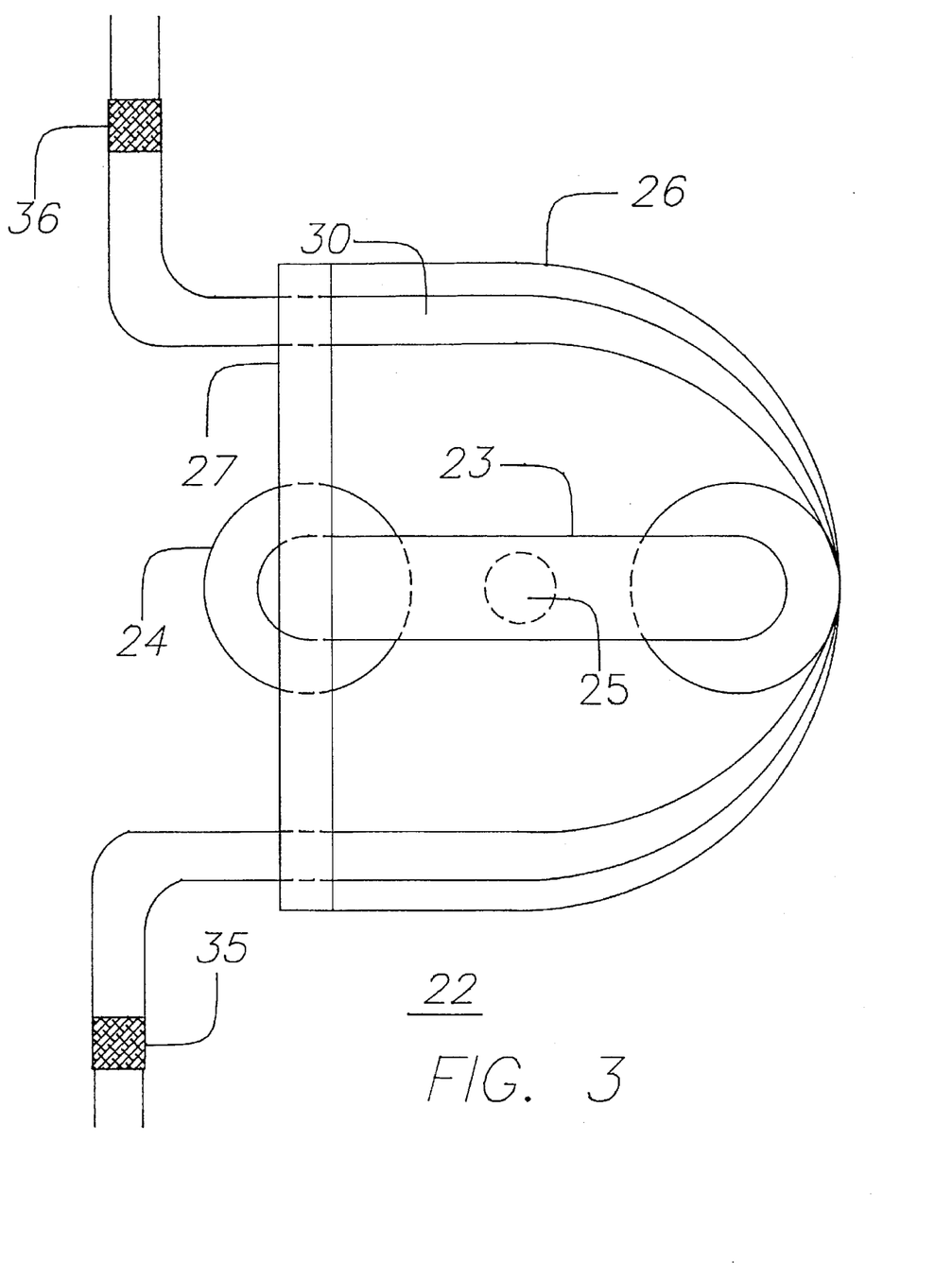
FIG. 3 is a block diagram of a squeeze pump used in a preferred embodiment of the invention.

In a preferred embodiment of the present invention, the pump (22) is a variable speed roller (squeeze) pump which uses the squeezing action of rollers on flexible tubing to create the pumping action. With this type pump, the rate of flow is proportional to the speed of the rollers and the size of the tubing. Referring now to FIG. 3, there is shown a schematic diagram of a roller pump. The pump includes a back plate (26), two rollers (24) which are connected to a shaft (23) rotated by an axile (25). As the shaft (23) rotates, the rollers (24) squeeze the flexible tubing (30) against the back plate (26) causing the pumping action. Tube (30) is held in place by a removable plate (27). Tubing (30) includes two connectors (35,36) so the tubing which comes in contact with the rollers can be changed.

A stepper motor (not shown) rotates the axile (25) and thus the shaft (23) to cause the pump to dispense a preset amount of liquid. The MP (11) controls the amount of liquid dispensed by controlling the stepper motor through a stepper motor pulse driver (21). Stepper motor drivers are available from Spraque Electric Company, Worchester Mass. As later discussed, the stepper motor load is controlled by step-logic functions.

The basic principle of a roller (squeeze) pump provides several advantages in the present application. This type pump is self-priming, and the rollers automatically form a seal when the motor is not pumping. In addition, the liquid never contacts any part of the pump, only the tubing from the reservoir to the spout. This is an important feature with an alcoholic beverage which is to be consumed. One does not have to be concerned with, for example, plastic or metal pistons and other components as may be used in other pump types. The alcohol, which is a good solvent, is exposed only to the insert tubing (commercially available) from bottle to spout.

Figure 4:
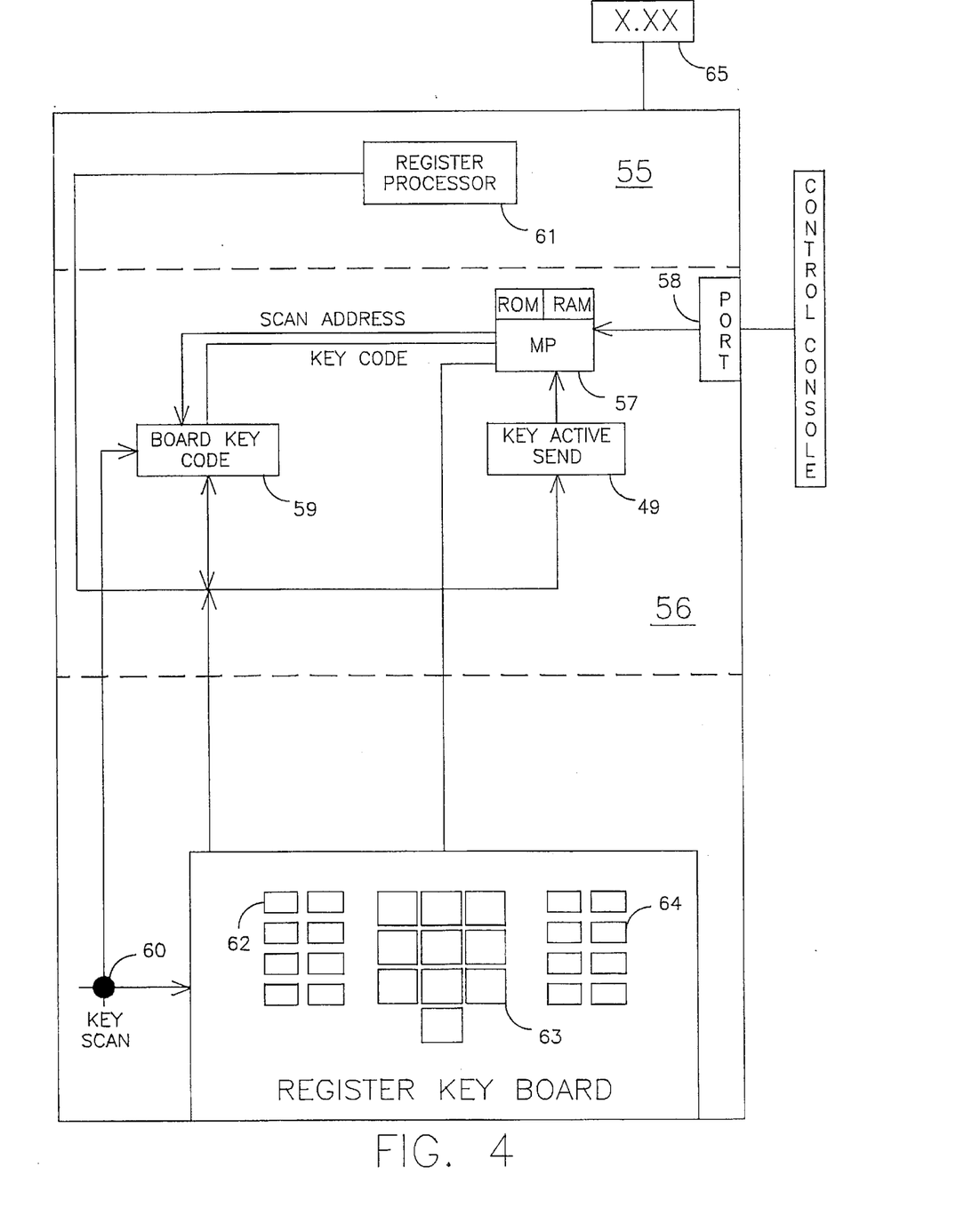
FIG. 4 is a block diagram showing a cash register interface board for down-loading information from the control console to a cash register.

Previously there was discussed the dispenser control system (11) interfaced to a POS system (46) through a driver (51). In other situations, it would be advantageous to interface the control console (11) to a cash register for downloading information. Cash registers typically have input keys which can be programmed to function as a department. A disadvantage to this is that the input key has to be manually depressed. Referring now to FIG. 4, there is shown a register interface board which allows information from the control console (11) to be automatically down-loaded to a cash register, generally designated (55). Cash registers typically have input keys (62), integer keys (63), and function keys (64). The register interface board automatically down-loads information on the type and number of times a liquid has been dispensed without having to be keyed in. There is shown a block diagram of the interface board, generally designated (56) which is set off by dashed lines. It includes a MP (57) with ROM and RAM, connected to the dispenser console through an I/O port (58). The MP (12) in the control console (11) down-loads information to the MP (57) on the register interface board, whereafter the information is routed to the designated department. During operation, the MP (57) sends a scan address to the board key code chip (59) to cause key scan chip (60) to scan the register keyboard. If the register key board is idle, it is locked out. By activating key active (49), the information is transferred from MP (57) to the designated department through a key code to register processor (61). The key board is then Unlocked so other information can be keyed in.

Figure 5:
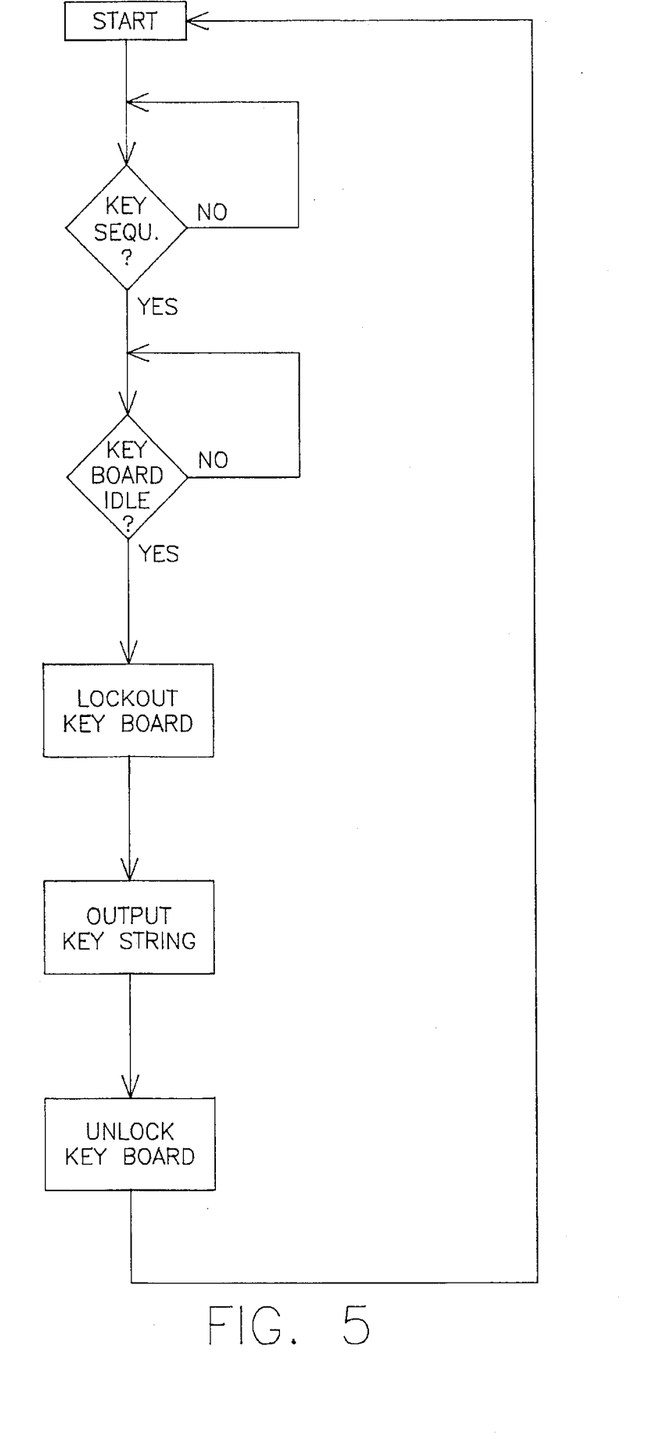
FIG. 5 is a flow chart illustrating the program for operation of the control console-register interface.

Referring now to FIG. 5, there is shown a flow chart for the cash register interface circuit (56) for down-loading information to a designated department in the cash register. First, there is a key sequence decision block to poll for key sequences. When positive, a key board idle decision block determines if the key board is idle. If so, the key board is locked out and MP (57) outputs a key string to designated a key whereby the information is posted in the department. The key board is then unlocked so other transactions can be keyed in.

Figure 6:
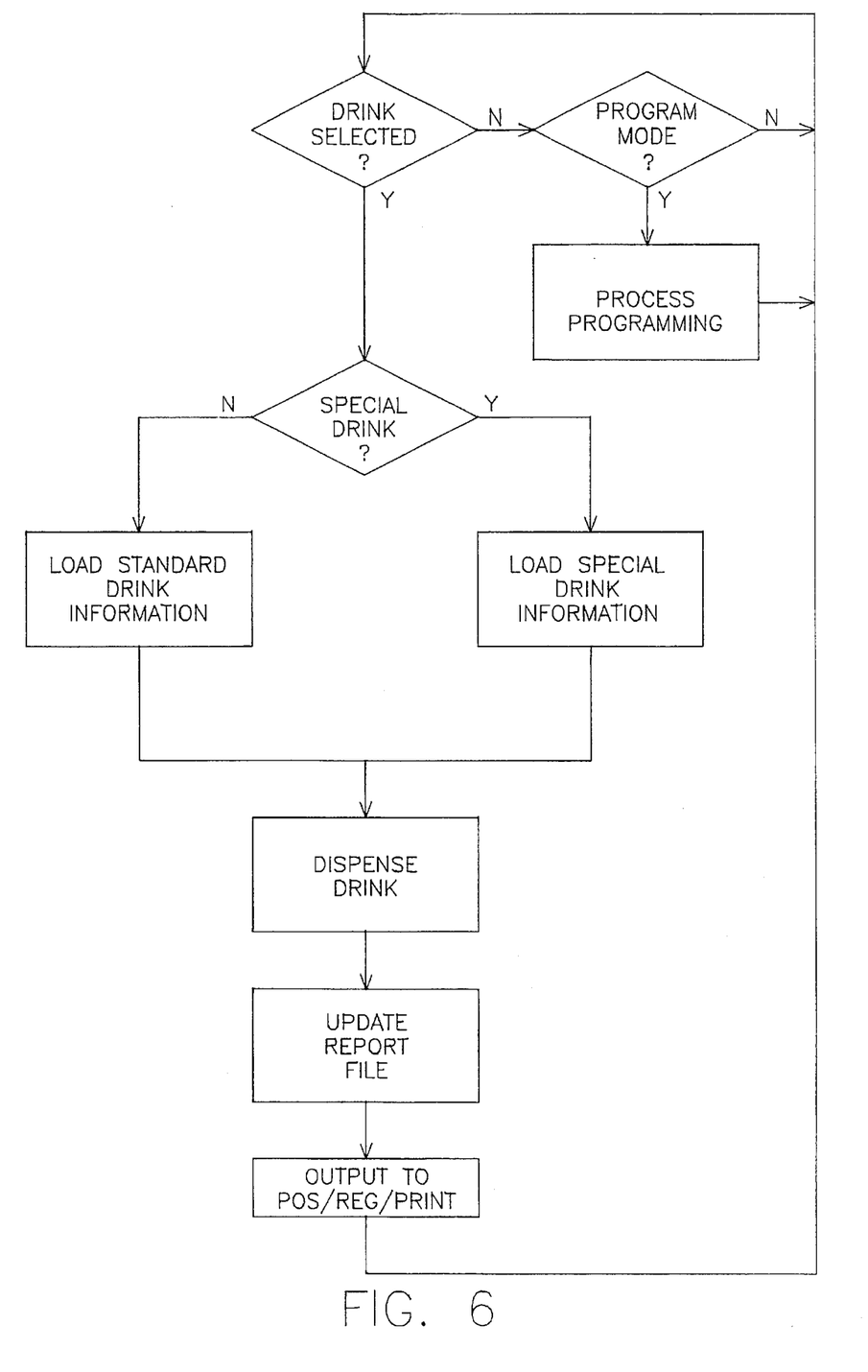
FIG. 6 is a flow a chart for the main software program for the control console generally stored in RAM.

Referring now to FIG. 6, there is shown a flow chart for the main operating system for the control console (11). First, there is a decision block DRINK SELECTED where one can go into the programming mode or into the dispensing mode. In the program mode one can input, for example, input information into a key pad (not shown) on the control console such as the amount of liquid to be dispensed. It is noted that several liquid types can be programmed in depending on the number of dispensing pumps. When the input data has been completed, the program information is processed and stored in memory. During operation, the DRINK SELECTED decision block determines when there is a request to dispense liquid, i.e., the activation switch (31) has been activated. Next, there is a SPECIAL DRINK decision block. Under normal operating conditions the control console causes the amount of liquid previously programmed in to be dispensed, generally from 0.5 to 32 ounces depending on the liquid type. Under certain conditions, special drink information is loaded. For example, in the preparation of a cocktail, it may be desirable to dispense one half the normal amount of one type beverage and one half the normal amount of another type beverage. Depending upon weather standard drink information or special drink information has been loaded, the liquid is dispensed through the previously discussed pulse driver source. The report file is thereafter updated, and the information down-loaded to a POS system, cash register, or printer.

Figure 7:
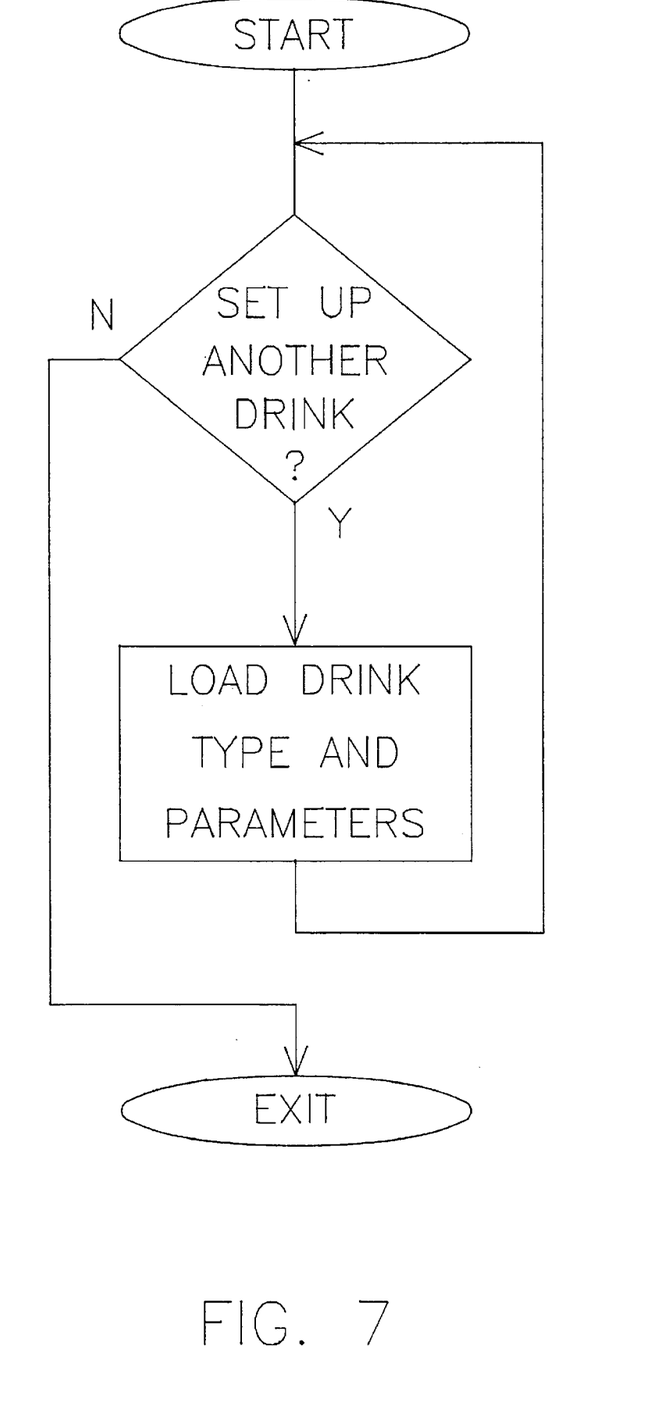
FIG. 7 is a flow chart for programming in a plural number of liquids to be dispensed into the control console.

The control console (11) can be programmed to cause several pumps to dispense a preset amount of different liquid. Referring now to FIG. 7, there is shown a flow chart for programming in drink information, depending on the number of dispensing pumps. A decision block determines if there is information for another drink to be entered. If so, the drink type and other programming information including the amount to be dispensed is loaded.

Figure 8:
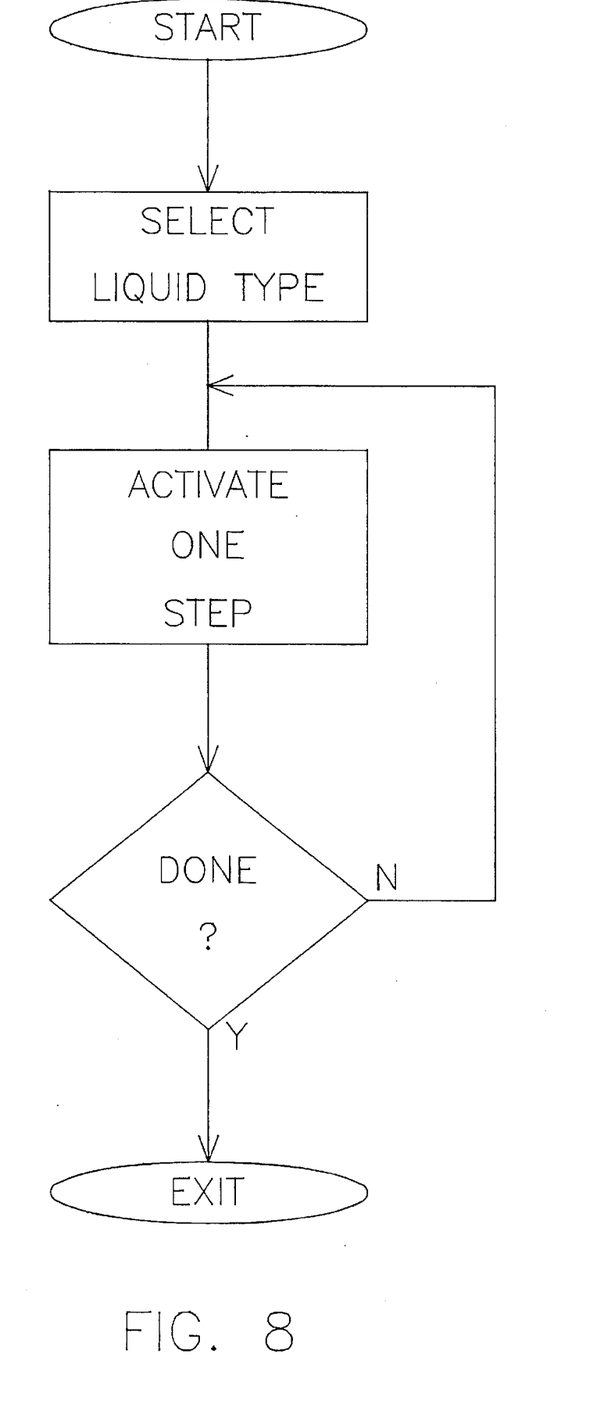
FIG. 8 is a flow chart for illustrating the dispensing of a drink.

As previously discussed, in a preferred embodiment of the present invention a stepper motor is used to drive the dispensing pump (22). The MP (12) in the control console (11) is connected to a stepper motor pulse drive source (21) for driving the stepper motor. Referring now to FIG. 8, there is shown a flow chart for the process for dispensing a drink. When a liquid type has been selected, the MP (12) causes the stepper motor to be activated one step, which is repeated until the preset amount of steps have been completed where the number of steps is proportional to the amount to be dispensed. The stepping process is then exited until another liquid type has been selected, and information for that liquid type loaded.

Figure 9:
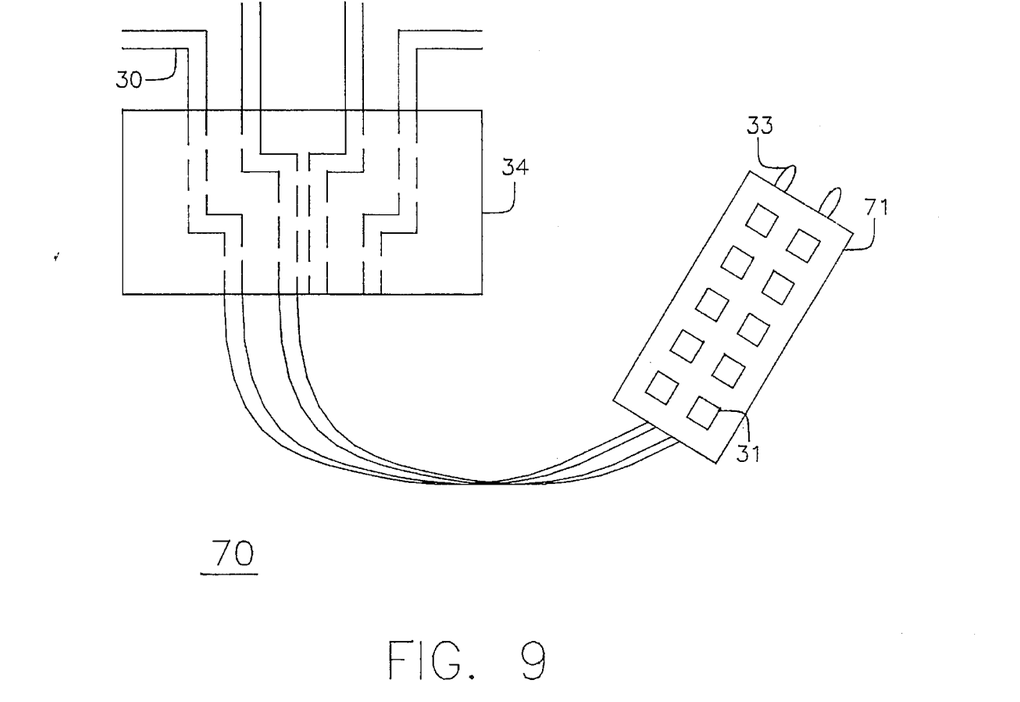
FIG. 9 is a schematic diagram showing the flexible hose dispensing head for dispensing the drinks.

Referring now to FIG. 9, there is shown a block diagram illustrating a flexible, hand held dispensing head, generally designated (71). The flexible dispensing head allows one to position the dispensing spout (33) over the glass. In the illustration, ten activating switches (31) are shown for demonstration, other numbers would apply depending on the number of dispensing pumps used. As an example, tube (30) runs from reservoir (40) (refer to FIG. 1) through pump (22) out spout (33). During operation, the bartender places the spout (33) over the glass into which he wishes to dispense the liquid. He presses the appropriate activation switch (31) which is electrically connected (not shown) to the control console (22) causing the console to dispense the preset amount of beverage.

Figure 10:
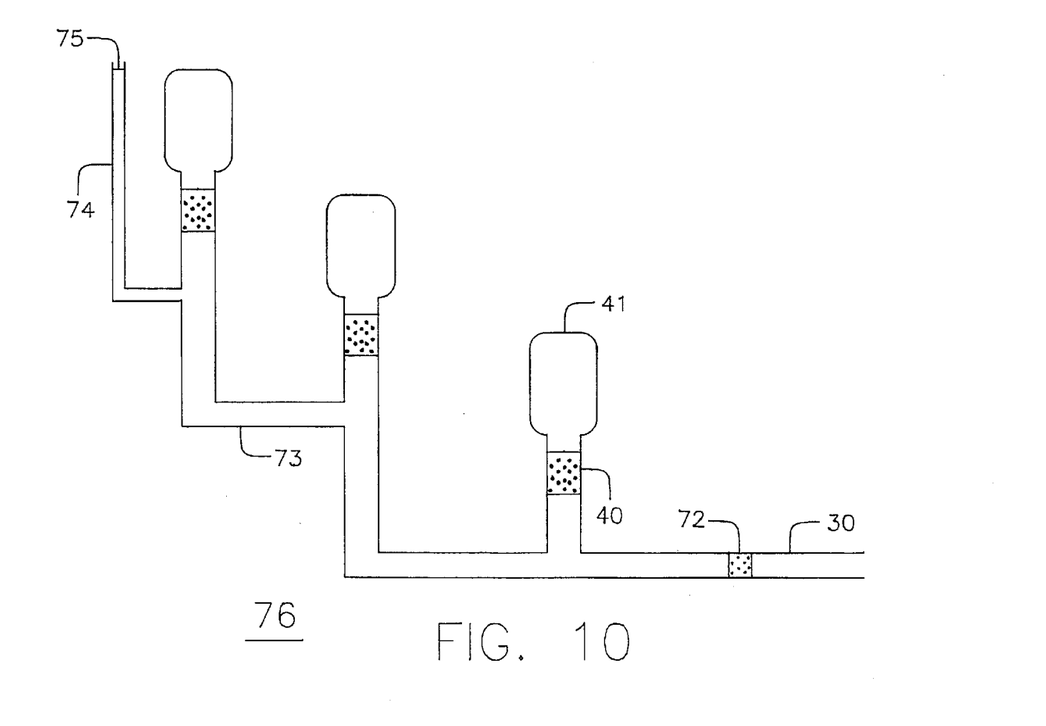
FIG. 10 is a block diagram showing the descending bottle manifold for securing the beverage bottles.

As further previously discussed, an important feature of the present invention is that it dispenses a liquid from a reservoir into a glass such that the liquid is exposed only to the tubing through which it is being dispensed. Referring now to FIG. 10, there is shown a block diagram of a descending bottle manifold, generally designated (72), for connecting more than one bottle together to form a common reservoir. The manifold (72) includes descending arms (73) connected together such that the liquid flows from the top bottle to the bottom bottle. This arrangement allows one to replace the top bottle when empty while the bottom bottle can be still full. An air inlet (74) allows air to flow in as the liquid is removed. The air-inlet has a one-way air inlet valve (75). The descending arms (73), bottle seal (40), air inlet (74), and one way air inlet valve (75) constitute a descending bottle manifold means.

The above described invention relates to a method and device for dispensing a preset amount of liquid, storing in memory information on the type and number of times the liquid has been dispensed, and down-loading this information to another device. While the invention has been described in the manner presently conceived to be most practical and a preferred embodiment thereof, it will be apparent to persons ordinarily skilled in the art that modifications may be made thereof within the scope of the invention, which scope is to be accorded the broadest interpretation of the claims such as to encompass all equivalents, devices, and methods.

What is claimed is:

1. A liquid dispenser-cash register control system for controlling the dispensing process in at least one liquid pump, for controlling at least one department input key switch in a cash register for transferring information on the dispensing transaction to said cash register, and for storing information including the number of times the liquid has been dispensed, comprising:

(a) a pump means, coupled to a tube connected to a liquid reservoir, for dispensing a preset amount of liquid from said reservoir;

(b) a control console means having a first microprocessor with a first read-only-memory device and a first read-and-write-memory device, coupled to said pump means and an activation switch, for (1) receiving an activation signal from said activation switch;

(2) controlling said pump means causing said first microprocessor to retrieve pump control commands from said first read-only-memory device in a predetermined sequence and output said commands to said pump means causing said pump to dispense a preset amount of liquid;

(3) storing information in said first read-and-write-memory device including the type and number of times the liquid has been dispensed; and (4) transferring to said cash register said information including the type and number of times the liquid has been dispensed;

(c) a cash register interface means, with connection to said first microprocessor in said control console means, having a second microprocessor with a second read-only-memory device and a second read-and-write-memory device, for (1) receiving from said first microprocessor information including the type and number of times the liquid has been dispensed; and (2) controlling said department input key switch in said cash register to cause said information including the type and number of times the liquid has been dispensed to be down-loaded to said cash register.

2. A liquid dispenser-cash register control system as recited in claim 1, wherein said pump means includes a stepper motor for driving the pump.

3. A liquid dispenser-cash register control system as recited in claim 1, wherein said pump means is a squeeze type pump.

4. A liquid dispenser control system for controlling the dispensing process in at least one liquid pump, for storing information including the type and number of times the liquid is dispensed, and for down-loading to a Point-of-Sales system said information including the type and number of times the liquid has been dispensed, comprising:

(a) a pump means, coupled to a tube connected to a liquid reservoir, for dispensing a preset amount of liquid from said reservoir;

(b) a control console means having a first microprocessor with a first read-only-memory device and a first read-and-write-memory device, coupled to said pump means and an activation switch, for (1) receiving an activation signal from said activation switch;

(2) controlling said pump means causing said first microprocessor to retrieve pump control commands from said first read-only-memory device in a predetermined sequence and output said commands to said pump means causing said pump to dispense a preset amount of liquid;

(3) storing said information in said first read-and-write-memory device including the type and number of times the liquid has been dispensed;

(4) transferring to said point-of-sales system said information including the type and number of times the liquid has been dispensed;

(c) a point-of-sales means, connected through a driver to said first microprocessor in said control console means, having a second microprocessor with a second read-only-memory device and a second read-and-write-memory device, for (1) receiving from said first microprocessor in said control console means information including the type and number of times the liquid has been dispensed by said pump means;

(2) storing said information including the type and number of times the liquid has been dispensed.

5. A liquid dispenser control system as recited in claim 4, wherein said pump means includes a stepper motor for driving the pump.

6. A liquid dispenser control system as recited in claim 4, wherein said pump means is a squeeze type pump.

7. An alcoholic beverage dispenser control system for controlling the dispensing process in at least one dispenser pump, for storing information including the number of times the alcoholic beverage has been dispensed, and for downloading said information to a printer, comprising:

(a) a bottle manifold means, for connecting together plural bottles of alcoholic beverage to form a reservoir;

(b) a pump means, coupled to a tube connected to said bottle manifold means, for dispensing a preset amount of alcoholic beverage from said bottle manifold means;

(c) a control console means having a processor means including plural input/output ports, programmable read-only-memory and read-and-write-memory, coupled to said pump means and an activation switch, for (1) receiving from said activation switch an activation signal;

(2) controlling said pump means by causing said processor to retrieve control commands from said read-only-memory in a predetermined sequence and output said commands to said pump means causing said pump to dispense a preset amount of alcoholic beverage;

(3) storing information in said read-and-write-memory including the number of times the liquid has been dispensed;

(c) a printer means, coupled to said processor means, for receiving and printing said information including the number of times the alcoholic beverage has been dispensed.

8. The combination as set forth in claim 7, further comprising:

a flexible dispensing head means, connected to said tube connected to said bottle manifold means, for directing said alcoholic beverage from said pump means to a glass.

* * * * *